Oct. 16, 1956 M. M. BAKER 2,766,596
MOULDS OR CONTAINERS FOR THE MAKING OF ICE BLOCKS, FROZEN
CONFECTIONS AND THE LIKE
Filed Nov. 13, 1953 2 Sheets-Sheet 1
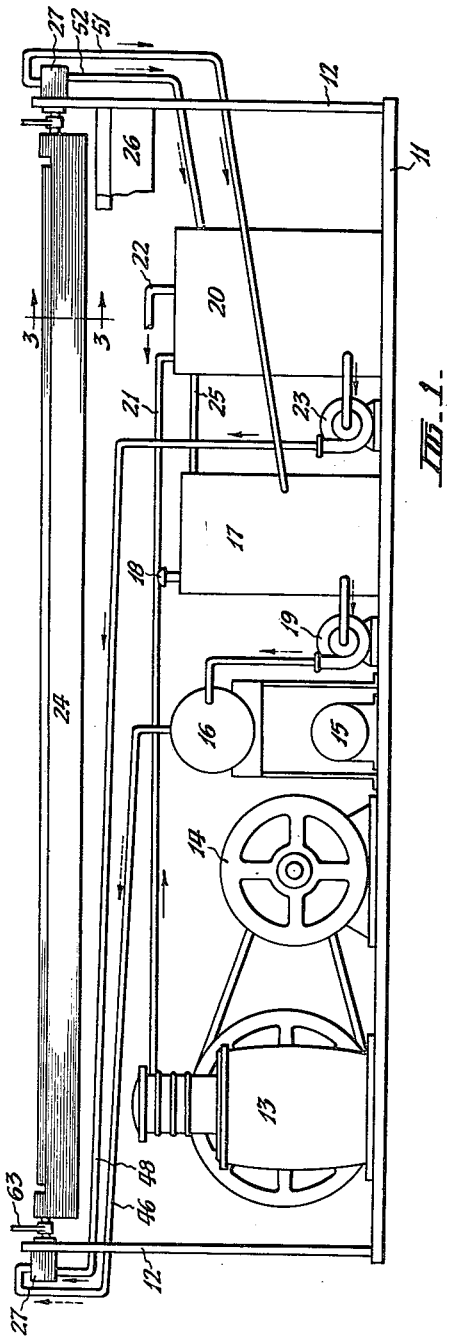
INVENTOR
MATTHEW MATTINGLY BAKER
BY Oberlin & Limbach
ATTORNEYS Oct. 16, 1956 M. M. BAKER 2,766,596
MOULDS OR CONTAINERS FOR THE MAKING OF ICE BLOCKS, FROZEN
CONFECTIONS AND THE LIKE
Filed Nov. 13, 1953 2 Sheets-Sheet 2
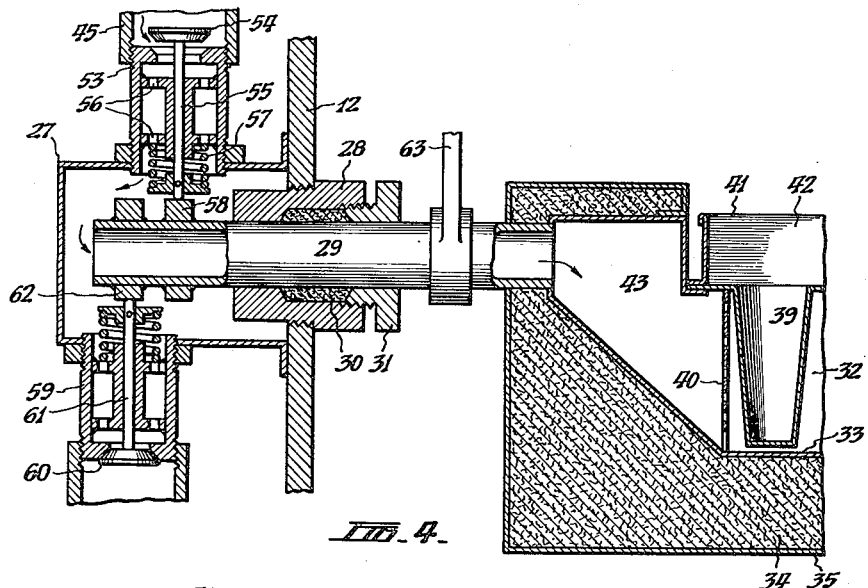
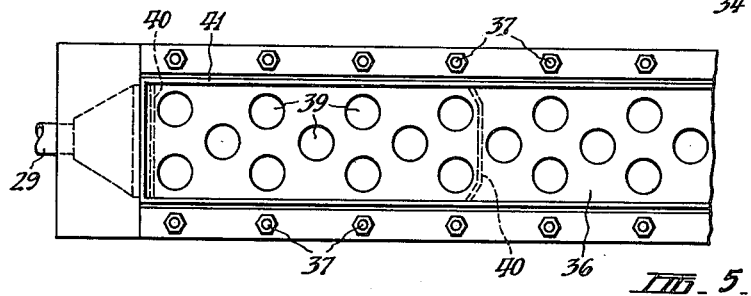
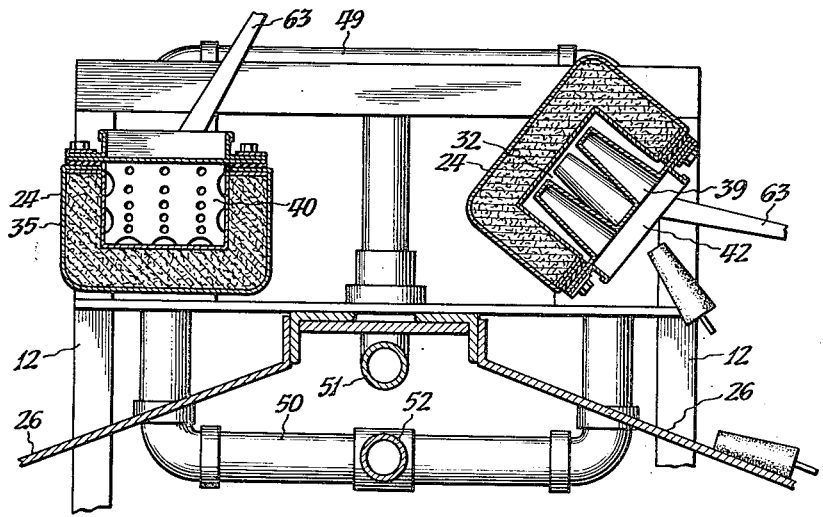
INVENTOR
MATTHEW MATTINGLY BAKER
BY
Oberlin & Limbach
ATTORNEYS.

United States Patent Office 2,766,596
Patented Oct. 16, 1956

2,766,596

MOULDS OR CONTAINERS FOR THE MAKING OF ICE BLOCKS, FROZEN CONFECTIONS AND THE LIKE

Matthew Mattingly Baker, West Heidelberg, near Melbourne, Victoria, Australia

Application November 13, 1953, Serial No. 391,915

Claims priority, application Australia November 17, 1952

8 Claims. (Cl. 62—114)

This invention relates to improvements in moulds or containers for the making of ice blocks, frozen confections and the like (hereinafter referred to generally as "ice blocks").

It is well known that in order to make such frozen confections commercially the liquid mix from which they are made is poured into a mould member having a number of moulds for the formation of the individual ice blocks. A coolant liquid or gas is then passed about the moulds so as to effect freezing of the liquid in the moulds. Then, the mould member is inverted so as to eject the frozen confections from the moulds. But, the ice blocks adhere to the sides of the moulds and it is usual to dip the mould member in warm water so as to effect a "thawing" of the surfaces of the ice blocks in contact with the inner walls of the moulds.

It is, therefore, an object of the invention to provide mould means for the making of ice blocks having associated therewith means for thawing the surfaces of the ice blocks in contact with the moulds so that the ice blocks may be conveniently ejected from the moulds.

In the commercial manufacture of ice it is customary to provide a "dip tank" having therein a quantity of warm water into which the ice moulds are dipped so as to effect the desired thawing of the ice surfaces. But, in order to do this it is necessary to carry the ice-containing moulds from the freezing tank to the dip tank and to then carry the moulds back to the platform onto which the ice is tipped.

A further object of the invention is to provide a machine for making ice blocks and incorporating a mould member having associated with it means for introducing the coolant or freezing fluid in such manner that the liquid in the moulds of the mould member will be frozen, and also having means for reversing the freezing process for a controllable period, so that the ice blocks may be conveniently ejected from the mould member. Another object is to provide a mould member, having a compartment for the freezing liquid or gas, and means for supplying to that compartment in substitution for the freezing fluid a warming fluid, so that the walls of the mould will be heated somewhat to enable the ice blocks which are formed in the moulds to be ejected, and means for reversing the interchange of fluids. Yet another object is to devise means of simple nature for effecting interchange of coolant and heating fluids in a mould for the purposes specified.

The invention devised with these and other objects in view provides, broadly, a mould for the formation of ice blocks, a chamber about the mould for containing a coolant so as to effect freezing of liquid in the mould, and means for effecting interchange of a warming agent for the coolant. A feature of the invention resides in the arrangement of the apparatus so that the warming fluid will be fed into the chamber when the mould is inverted for the ejection of the ice blocks, and the coolant will be fed into that chamber when the mould is returned to initial or upright position. The supplies of coolant and warming agent may be introduced to the chamber in the same direction so that the fluid will flow through the chamber in the one direction, or the coolant may be introduced to the chamber in one direction and the warming agent introduced in the opposite direction. It is preferred to use the same fluid—as brine—for the warming of the moulds as well as for the cooling thereof, and to arrange the apparatus so as to provide for maximum thermal efficiency of the apparatus. For this purpose the warming fluid may be heated by effecting a heat transfer from the hot gases of a refrigerator compressor, which will be cooled thereby.

In order that the invention may be clearly understood and readily put into practical form I shall now describe, with reference to the accompanying illustrative drawings, a preferred construction of apparatus made according to the invention. In these drawings:

Fig. 1 is a view of the apparatus in side elevation;

Fig. 2 shows, on enlarged scale, an end view of the principal part of the apparatus shown in Fig. 1—the mould carriers and the pipes controlling the flow of fluid thereto;

Fig. 3 is a transverse cross-section, on enlarged scale, through one of the mould carriers, the section being taken on the line and in the direction of the arrows 3—3 of Fig. 1;

Fig. 4 is a longitudinal cross-section on enlarged scale through the valve for controlling the flow of fluid to one of the mould carriers and through one end portion of the associated mould carrier, the cross-section being taken on the line and in the direction of the arrows 4—4 of Fig. 2;

Fig. 5 shows portion of a mould carrier in plan view; and

Fig. 6 illustrates, in transverse cross-section, the mode of operation of the apparatus.

The complete apparatus depicted in Fig. 1 includes a base member 11 on which is mounted the frame 12 of the machine and also a compressor 13, a motor 14 to drive the compressor, a receiver 15 for liquid refrigerant, a brine cooler 16, a cold brine storage tank 17 having a breather tube 18 at its upper end, a pump 19 for pumping cold brine from the storage tank 17 to the brine cooler 16, a warm brine storage tank 20 having in it coils (not shown) through which is passed the hot discharge gas from the refrigerator compressor 13, said coils being connected to the compressor by a pipeline 21 and to a condenser (not shown) by a pipe 22, and a pump 23 for pumping the warm brine from the storage tank 20 to the mould members—indicated generally in Figs. 1 and 2 by the reference 24. The two brine storage tanks 17 and 20 are connected together by a pipe 25.

Near the upper end or top of the machine frame 12, and below the mould members 24, there are securely fastened two trays 26 arranged so as to be adapted to receive the ice blocks which are ejected from the moulds 24. Above these trays 26, at opposite ends of the frame 12, there are secured valve housings 27 which partially enclose bearings 28 wherein are rotatably mounted substantially horizontal hollow spindles 29, one such hollow spindle being provided at each end of each mould member 24. Two such mould members 24 are provided in the machine, as is shown in Figs. 2 and 6. About each hollow spindle 29 there is fitted a gland 30 and a gland nut 31, the glands 30 being provided to prevent escape of fluid from the valve housings 27 past the bearings 28.

Each of the composite moulds 24 for the formation of the ice blocks consists of a trough 33, a quantity of insulation 34 provided around the base and sides of the trough 33, a protecting cover 35 secured to the trough 33 so as to enclose the insulation 34, the cover 35 having inturned flanges by means of which it is fastened to out-turned flanges at the upper edges of the sides of the trough 33, and a mould plate 36 fastened to the trough 33. The trough 33, cover 35 and mould plate 36 are fastened together by bolts 37 which fit through the flanges of the trough 33 and the cover 35, and through side members of the mould plate 36. Sealing gaskets 38 are provided between the inturned flanges of the cover 35 and the side members of the mould plate 36.

The trough is substantially rectangular in shape, in transverse cross-section, and the mould plate 36 covers the top of the trough 33, so that there is an enclosed chamber 32 within the trough 33. The mould plate 36 has a number of moulds 39 which fit within the chamber 32, within the trough 33. These moulds 39 are arranged in somewhat staggered relationship so as to provide for a relatively efficient transference of heat between the fluid flowing through the chamber in the trough 33 and the walls of the moulds 39. Perforated baffles 40 are provided within the trough 33 so as to further break up the flow of fluid through the trough. The mould plate 36 has upwardly extending sides 41 which provide a compartment 42 above the tops of the moulds 39.

The hollow spindle 29 at each end of each mould member 24 is connected to a compartment 43 at the end of the trough 33 in such manner that fluid may flow through the hollow spindle 29, into the compartment 43 at one end of the trough 33, and thence through the chamber 32 between the mould plate 36 and the trough 33, into the compartment 43 at the other end of the trough 33, and then out through the hollow spindle 29 at the other end of the mould chamber 24.

The housings 27 fastened to the machine frame 12 at the ends of the machine fit about the outer ends of the hollow spindles 29, the housings 27 at one end of the machine being the inlet housings and those at the other end of the machine being the outlet housings. The two inlet housings 27 at one end of the machine are connected together by a header pipe 45 which is connected in turn by a pipe 46 to the brine cooler 16, and they are also connected together by a second header pipe 47 which is connected to the pump 23 by means of a pipe 48. This pump is in turn connected to the warm brine storage tank 20 and it is so operated that it may be used to pump warm brine from the storage tank 20 to the inlet housing 27. The two outlet housings 27 at the other end of the machine are connected together by header pipes 49 and 50, the header pipe 49 being connected by a pipe 51 to the cold brine storage tank 17 and the header pipe 50 being connected by pipe 52 to the warm brine storage tank 20.

The header pipe 45 at the inlet end of the machine is connected at each of its opposite ends to an upper valve housing 53 which is secured to the upper side of the inlet housing 27. In each of the valve housings 53 is mounted a valve member 54 of poppet valve type having a valve head which registers with a valve seating at one end of the valve housing 53 when said valve is closed, and a valve stem 55 slidable in a guide in said valve housing 53. Openings 56 are provided in the valve housing 53 so as to permit the flow of cold brine through the valve housing when the valve is open, and said valve member is spring loaded by means of a compression spring 57. The end of the valve stem 55 is adapted to bear upon a cam 58 fastened to the related hollow spindle 29.

The second header pipe 47 at the inlet end of the machine is connected, similarly, at each of its opposite ends to a lower valve housing 59 which is secured to the underside of the relative inlet housing 27. In each of these valve housings 59 is a poppet type valve member 60 having its stem 61 adapted to bear upon a cam 62 fastened to the hollow spindle 29 adjacent the cam 58. The two cams 58 and 62 are so arranged on the hollow spindle 29, and in relation to the two valve housings 53 and 59 and the valves therein, that when the moulds 39 are in upright position, with the open ends of the moulds 39 uppermost, as shown in Figs. 3 and 4 in particular, then the valve 54 of the upper valve housing 53 will be open to permit the flow of cold brine into the housings 27 and thence through the hollow spindle 29 into the mould chamber 32. When the composite mould member 24 is moved from that upright position—as by means of a handle 63 fastened to the hollow spindle 29 between the gland nut 31 and the adjacent end of the cover 35—then the cam 58 will be turned to inoperative position and the valve 54 of the upper valve housing 53 will be closed under the pressure of the spring 57. After that valve 54 has been moved to closed position, and upon further rotation of the spindle 29, the cam 62 will operate to move the valve member 60 to open position so as to permit the flow of warm brine into the housing 27 and thence to the mould chamber 32.

At the opposite end of the machine the outlet housings 27 are constructed in somewhat similar fashion, each outlet housing 27 having an upper valve housing 53 and a lower valve housing 59 in which are mounted, respectively, a cold brine outlet valve member 54 and a warm brine outlet valve member 60. On the hollow spindle 29 at the outlet end of the machine are cams 58 and 62 which act upon the stems 55 and 61 of said valve members in the same fashion as already described.

That is to say, the outlet valves 54 and 60 are closed by spring pressure and opened by the action of the cams 58 and 62, respectively. The two poppet valves 54 and 60 of the one housing 27, and the cams 58 and 62 associated therewith, are so arranged that when the valve 54 controlling the inlet of cold brine to the inlet housing 27 is in open position then the valve 60 controlling the inflow of warm brine to that housing will be closed, so that either cold brine or warm brine, but not both simultaneously, may be fed into the chamber 32. Similarly, only the one outlet valve will be open at the one time, in the one outlet housing.

The cold brine inlet and outlet valve members 54 are arranged so that when the composite mould 24 is in upright position as illustrated in Figs. 3 and 4 then there will be a through-flow of cold brine, with cold brine flowing into the mould chamber 32 at one end thereof, out through the outlet valve 54 and back to the cold brine storage tank 17. And when the composite mould member 24 is tilted and the cold brine inlet valve 54 is closed the cold brine outlet valve 54 in the outlet housing 27 will remain open for a short interval of time so as to permit a portion of the brine which is in the mould chamber 32 to escape through the cold brine outlet and return to the cold brine storage tank 17.

When the mould member 24 is turned from the upright position to the tilted position as illustrated in Fig. 6, and the warm brine inlet valve 60 is opened, the warm brine will flow through the hollow spindle 29, into the compartment 43 at one end of the mould member, thence through the chamber 32 to the compartment 43 at the other end of the mould member 24. In that flow the warm brine will force the cold brine before it, and it will be found that there will be relatively litle intermixing of the warm brine with the cold brine. It is preferred that the timing of the cold brine outlet valve 54 in relation to the warm brine inlet valve 60 should be such that the cold brine outlet valve 54 will close before warm brine is pumped to the outlet valves, so as to prevent warm brine flowing into the cold brine storage tank 17. Simultaneously with the closing of the cold brine outlet valve 54 the warm brine outlet valve 60 is opened, to permit the warm brine to continue in its flow through the mould chamber 32. The warm brine exhausted from the mould members 24 is returned to the warm brine storage tank 20.

In certain instances—as when operating in warm climates—it may be found desirable for the cold brine outlet valve 54 to be closed simultaneously with the cold brine inlet valve 54 and the warm brine outlet and inlet valves 60 to be opened together immediately after the closing of the cold brine inlet and outlet valves so that cold brine within the chamber 32 will be exhausted to the warm brine storage tank. This may be found to be desirable if the brine in the warm brine storage tank 20 is being heated to too high a temperature.

When a composite mould member 24 is returned from the inverted position as shown in Fig. 6 the warm brine inlet valve 60 is first closed and then the cold brine inlet valve 54 is opened, and the cold brine then admitted forces the warm brine from within the chamber 32.

It is apparent that when the mould member 24 is inverted, as shown in Fig. 6, and warm brine is forced through the inlet valve 60 then the warm brine will warm the sides of the moulds 29 and cause a thawing of the surface of the ice block in contact with the mould 39. Then, the ice blocks will fall gravitationally from the moulds 39 on to the tray 26 from which they may be collected. The two composite mould members 24 may be operated separately—as indicated in Fig. 6—or they may be operated simultaneously.

If desired, there may be provided several trays of such size that they will fit within the compartments 42 at the upper ends of the mould members 24, said trays being adapted to receive and hold the ice blocks as they are freed from the moulds 39. Such trays could be used for carrying the ice blocks from the machine and for packing them for subsequent transport and/or storage.

Further, there may be provided any suitable catch means for releasably holding the mould members 24 in either of their two normal positions. Such catch means may consist, for example, of spring-loaded detents adapted to engage with the ends of the mould members 24 or with the handles 63.

The apparatus according to this invention may be operated by the use of brine, as described above, or there may be used any other suitable refrigerant such as ammonia, sulphur dioxide, or any other suitable fluid. Furthermore, there may be provided any suitable fluid for warming the surfaces of the moulds 39 in order to cause the surfaces of the ice blocks in contact therewith to be melted so that the ice blocks may be easily ejected from the moulds. It is also apparent that there may be provided other suitable types of valve mechanism; and if desired the mould members 24 may be rotated automatically, when there may be provided automatic control means for controlling the rotation of the mould members and the operation of the valves. If desired, the mould plates 36 may be made so that they can be readily interchanged one with another so that different moulds may be fitted into the trough 33 without requiring any modification of the trough or other parts of the machine. All such modifications as come within the broad scope of the appended claims are to be deemed as being included within the ambit of the invention.

What I do claim is:

1. Apparatus for the making of ice blocks and like frozen confections including a support, a trough-shaped housing rotatably mounted in the support, a mould plate fastened to the open side of the housing so as to provide a chamber between the plate and the walls of the housing, said mould plate carrying a series of moulds, transverse baffles mounted within the housing and extending across such chamber, a coolant supply, a warming agent supply, and means for feeding the coolant and the warming agent interchangeably to such chamber.

2. Apparatus for the making of ice blocks and like frozen confections including a support, a housing supported by said support for rotation about an axis generally aligned with the housing, a mould member fastened to the housing so as to provide a chamber between the mould member and the walls of the housing, means for partially rotating the housing relative to the support, a single tubular member connected to said housing at one end thereof and adapted to convey fluid to and from said chamber, means for feeding a coolant and a warming agent interchangeably to said chamber through such tubular member, and valve means including members operable by cams arranged on the tubular member for controlling the flow of fluid to and from the chamber.

3. Apparatus for the making of ice blocks and like frozen confections including end supports, at least one trough-shaped housing mounted between the end supports for rotation about an axis within the confines of the housing, a mould plate fastened to the housing, a series of moulds supported by the mould plate and extending into the housing so that there is a chamber between the walls of the housing, the mould plate and the moulds, a single tubular member at each end of the housing constituting the support for the same and communicating with said chamber, such tubular members being supported by the end supports and being in direct communication with the chamber respectively at the ends thereof, bearings for the tubular members, the tubular members having their axes coincident with such axis of rotation of the housing, a valve housing on each end support, each tubular member communicating directly with the interior of a valve housing, valve members associated with each valve housing, means for feeding a coolant fluid and a warming agent alternately to each valve housing through the valve members, and means for operating the valve members, the parts being so arranged that they are adapted to feed coolant to said chamber through one valve housing and the related tubular member as the warming agent is exhausted from said chamber through the other tubular member and valve housing, and to feed the warming agent to said chamber as the coolant is exhausted therefrom.

4. Apparatus as claimed in claim 3 wherein cam members are mounted on the tubular members, the cam members being adapted to actuate the valve members when the housing is partially rotated.

5. Apparatus as claimed in claim 3 and wherein there is provided a coolant storage tank and a cooler for the coolant, the coolant being forced from the cooler to one end of the chamber about the moulds and being delivered back to the coolant storage tank from the other end of the chamber.

6. Apparatus as claimed in claim 3 and wherein there is provided a storage tank for the warming agent and means for forcing the warming agent into one end of the chamber about the moulds and for exhausting the warming agent from the other end of the chamber back to the warming agent storage tank.

7. Apparatus for the making of ice blocks and like frozen confections including a support, a housing rotatably mounted in the support, a mould member fastened to the housing so as to provide a chamber between the mould and the walls of the housing, a single tubular member at each end of the housing in communication with said chamber, a coolant supply, a warming agent supply, valve means for feeding the coolant and the warming agent interchangeably to said chamber, and means for partially rotating the housing relative to the support about the axis of the tubular end members, said valve means including cam members mounted on the tubular members and operative in such manner that the valve means supplies the warming agent to the chamber when the mould member is inverted and supplies the coolant to the chamber when the mould member is in its upright position.

8. Apparatus for the making of ice blocks and like frozen confections, including a support, a trough-shaped housing rotatably mounted in the support, a mould member fastened to the open side of the housing so as to provide a chamber between the same and the walls of the housing, said mould member defining a series of moulds in longitudinally staggered relationship, transverse perforated baffles disposed within the housing and extending across said chamber, a coolant supply, a warming agent supply, and means for feeding the coolant and the warming agent interchangeably to the chamber.

References Cited in the file of this patent

UNITED STATES PATENTS

| Number | Name | Date |
|---|---|---|
| 2,287,255 | Langgard | June 23, 1942 |
| 2,400,517 | Kirkpatrick | May 21, 1946 |
| 2,403,275 | Gilliam | July 2, 1946 |
| 2,484,017 | Copeman | Oct. 11, 1949 |
| 2,493,900 | Schaberg | Jan. 10, 1950 |
| 2,504,610 | Wolf | Apr. 18, 1950 |
| 2,526,262 | Munshower | Oct. 17, 1950 |
| 2,545,558 | Russell | Mar. 20, 1951 |
| 2,559,414 | Erickson | July 3, 1951 |
| 2,569,113 | Munshower | Sept. 25, 1951 |